Nov. 20, 1956
W. MAXWELL
2,771,024
TENSIONING ADJUSTING DEVICE FOR THE
BALING CHAMBERS OF BALING PRESSES
Filed April 15, 1954
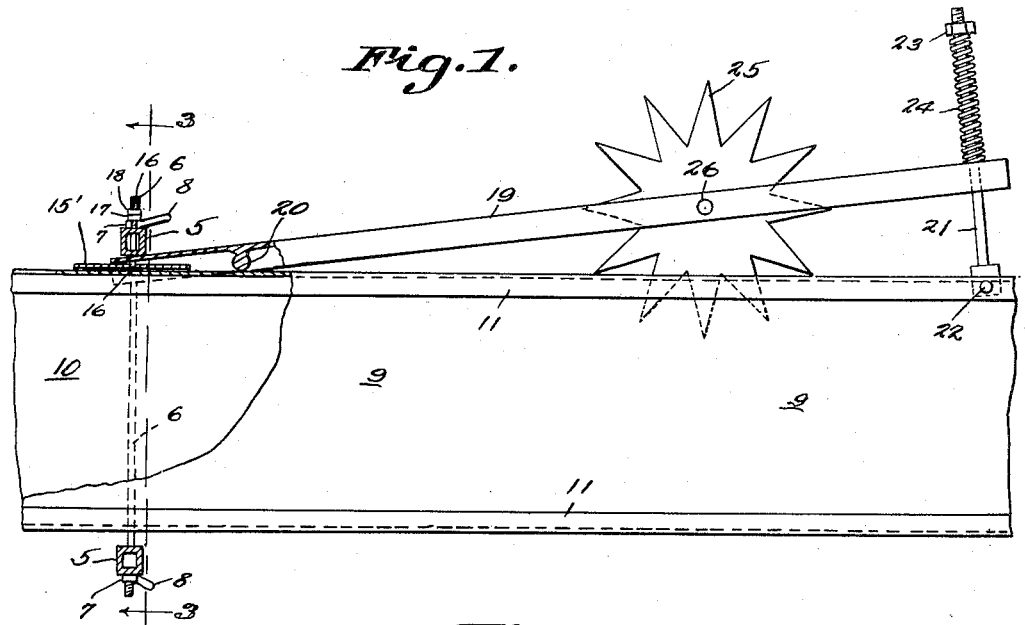
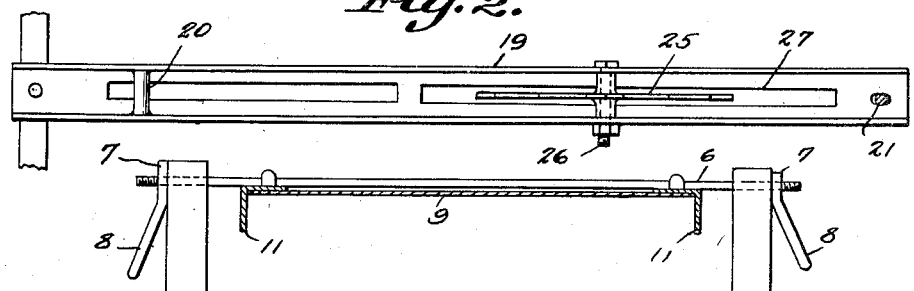
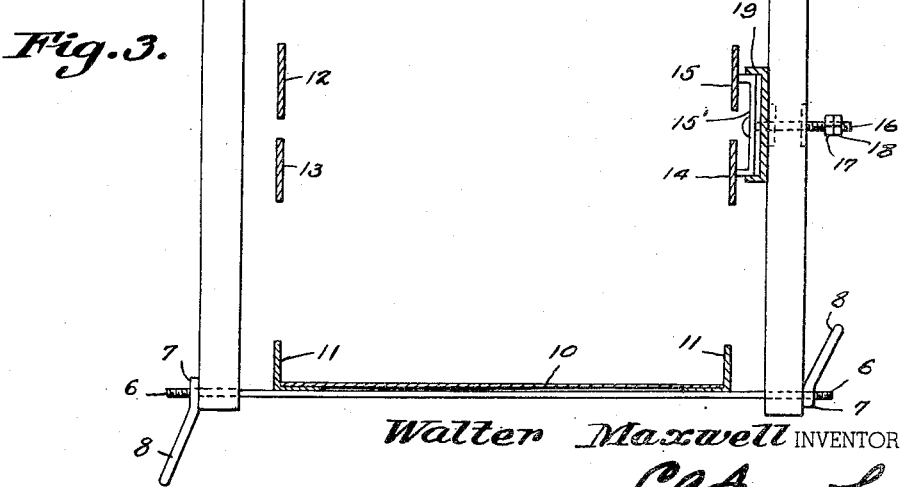
Walter Maxwell INVENTOR
BY C. A. Snow & Co.
ATTORNEYS.

United States Patent Office 2,771,024
Patented Nov. 20, 1956

2,771,024

TENSIONING ADJUSTING DEVICE FOR THE BALING CHAMBERS OF BALING PRESSES

Walter Maxwell, Marshfield, Wis., assignor of one-half to Glenn W. Maxwell, Marshfield, Wis.

Application April 15, 1954, Serial No. 423,337

1 Claim. (Cl. 100—43)

By way of explanation, it might be stated that during field baling of windrow material, the material which grows in low moist areas is appreciably heavier than the material grown in the higher or drier areas, to the end that the drier material slides through the baling chamber of the baler with decidely less friction than the greener or damper material, with the result that light spongy bales are formed from the dry material, while heavier or more solid and broken bales result in baling the green material, due to the resistance offered the material in passing through the baling chamber.

It is therefore the primary object of the present invention to provide means for automatically varying the amount of friction encountered by the material being baled, as it passes through the press or baling chamber, according to the condition of the material being baled, thereby forming uniform bales, regardless of variation in the texture or moisture content of the material being baled.

Another important object of the invention is to provide a device of this character which may be readily and easily attached to the tension rails of the conventional baler, without the necessity of making extensive alterations in the baler construction.

With the foregoing an other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing:

Figure 1 is a plan view illustrating the baling chamber of a baler, equipped with a tensioning device, constructed in accordance with the invention.

Fig. 2 is a side elevational view of the tensioning device.

Fig. 3 is a vertical sectional view through the baling chamber of a baler press, on line 3—3 of Fig. 1.

Referring to the drawing in detail, the baling chamber embodies vertical adjusting bars 5 arranged at the front and rear ends thereof, and at opposite sides of the baler. These adjusting bars are formed with openings adjacent to the respective ends thereof, the openings accommodating the rods 6, which rods connect the vertical adjusting bars and are held in their adjusted positions by means of the nuts 7 that are provided with operating handles 8.

The baling chamber also comprises an upper plate 9 and a lower plate 10, the plates having angle bars 11 secured along the longitudinal side edges thereof, said angle bars having their open sides disposed inwardly. These upper and lower plates form the top and bottom of the baling chamber and provide surfaces over which the baled material passes when passing through the baler.

The baling chamber also includes horizontal side plates 12 and 13 that have their side faces disposed vertically, the side plates 12 and 13 providing the side surfaces for the baling chamber over which the baled material passes.

At the opposite side of the baling chamber are laterally movable tension rails 14 and 15, which rails are engaged at points adjacent to one of their ends, by flanges of the channel bar 15', which bar is disposed horizontally of the baling chamber, the channel bar 15' having an opening through which the bolt 16 extends, the bolt 16 also passing through an opening in the bar 5, the bolt 16 being provided with a spacing nut 17 and a lock nut 18 for limiting inward movement of the bolt and channel bar 15'.

As clearly shown by Fig. 3 of the drawing, the adjusting bar forming the subject matter of the present invention, is indicated by the reference character 19, which is also provided with an opening through which the bolt 16 extends securing one end of the adjusting bar to the vertical adjusting bar 5. The bar 19 is of channel construction and fits over the channel bar 15' between the vertical adjusting bar 5 and channel bar 15'. Disposed within the adjusting bar 19 is a lug 20 which is disposed in spaced relation with the end of the adjusting bar 19 which connects with the tension rails 14 and 15, the lug 20 providing a fulcrum for the adjusting bar 19. The adjusting bar 19 is also formed with an opening through which the elongated bolt 21 extends, the bolt 21 being pivotally connected with the baling chamber, at 22. The elongated bolt 21 is formed with threads at its free end, on which the nut 23 is positioned, the nut 23 providing a stop for one end of the coiled spring 24 which has its other end resting on the adjusting bar 19. Thus it will be seen that due to this construction, the spring 24 normally biases the adjusting bar 19 towards the baling chamber.

The reference character 25 indicates a star wheel which is mounted for rotation on the adjusting bar 19, the star wheel 25 being mounted on a vertical shaft 26 so that the points of the star wheel will normally extend through the elongated opening 27 formed in the adjusting bar 19, for contact with the material which is being baled, and which passes through the baling chamber.

It will therefore be obvious that as the forward end of the adjusting bar 19, which is the end of the bar that is pivotally connected with the baling chamber through the medium of the elongated bolt 21, moves outwardly, the opposite end of the adjusting bar 19 will be also moved outwardly together with the laterally movable tension rails 14 and 15, thereby increasing the width of the interior of the baling chamber decreasing the friction between the material passing through the baling chamber and the plates 12, 13, 14 and 15.

This outward movement of the adjusting bar 19 and laterally movable tension rails is caused by the star wheel 25 engaging material which is being baled and which is necessarily packed to a greater degree than dry material, owing to the moisture content of the material.

It is obvious that when the lighter or drier material is being formed into a bale and passed through the baling chamber, the points of the star wheel 25 will pierce the material to a greater degree, and will allow a movement of the adjusting bar 19 and laterally movable tension rails to compensate for the lighter material passing through the baling chamber.

In this way it will be seen that when the heavier material is being baled, the width of the baling chamber will be slightly increased to reduce friction between the material and tension rails of the baling chamber, and when the material being graded is of a lighter character, due to the dryness of the material, the laterally movable tension rails will be moved inwardly to compensate for this dry condition, to the end that uniform bales will be formed, regardless of the condition of the material being baled.

Having thus described the invention, what is claimed is:

A baler comprising a baler chamber, movable tension rails forming the sides of said baler chamber, a tension rail adjusting device comprising a horizontal adjusting bar, a pivot bolt extending through an end of said adjusting bar whereby said bar may have both pivotal and sliding movement, a fulcrum lug extending laterally from said adjusting bar adjacent to the pivoted end thereof, said fulcrum lug having pressure engagement with the tension rail at one side of the baler chamber, a yieldable member connecting the other end of the adjusting bar to said baler and a star wheel mounted on said adjusting bar, extending into the baling chamber adapted to contact material moving through the baling chamber effecting lateral movement of the adjusting bar and tension rail, increasing or decreasing the baling area of said baling chamber.

References Cited in the file of this patent

UNITED STATES PATENTS 2,576,784  Dodds et al. _____ Nov. 27, 1951

FOREIGN PATENTS 672,520  Great Britain _____ May 21, 1952